United States Patent [19]

Shantz et al.

[11] 4,172,514
[45] Oct. 30, 1979

[54] HIGH SPEED CONTINUOUS ASSEMBLY MACHINE

[75] Inventors: Ivan L. Shantz; Lyell C. Tullis, both of Janesville, Wis.

[73] Assignee: Giddings & Lewis, Inc., Fond du Lac, Wis.

[21] Appl. No.: 766,355

[22] Filed: Feb. 7, 1977

[51] Int. Cl.$^2$ ............................................. B65G 47/86
[52] U.S. Cl. ................................. 198/479; 198/653; 198/696
[58] Field of Search .................. 29/771, 783, 786–791, 29/793–797, 822, 823, 809, 33 P, 563; 198/339, 420, 449, 601, 479, 540, 562, 653, 695, 696, 793; 214/1 BA; 294/99 S, 103 R, 104, 106, 116

[56] References Cited

U.S. PATENT DOCUMENTS

| | | | |
|---|---|---|---|
| 1,336,028 | 4/1920 | Fentress | 198/696 |
| 2,546,504 | 3/1951 | Head | 198/696 |
| 2,612,254 | 9/1952 | Carter | 198/696 |
| 3,172,455 | 3/1965 | Rively et al. | 198/479 |
| 3,191,357 | 6/1965 | Hawley et al. | 198/420 |
| 3,330,400 | 7/1967 | Alexander | 198/696 |
| 3,379,298 | 4/1968 | Willis | 198/793 |
| 3,659,694 | 5/1972 | Harris | 198/479 |
| 3,795,965 | 3/1974 | Sherman | 29/783 |
| 3,942,236 | 3/1976 | Elmer | 29/783 |

*Primary Examiner*—Joseph E. Valenza
*Attorney, Agent, or Firm*—Leydig, Voit, Osann, Mayer & Holt, Ltd.

[57] ABSTRACT

A high speed continuous assembly machine adapted to handle and assemble a variety of regular parts such as tubes, discs, rods and cylinders at rates varying from 120 to 1200 assemblies per minute. The machine utilizes a work transport conveyor of the endless band, straight line type moving in a vertical plane, and one or more satellite stations spaced longitudinally along the transport conveyor. Each satellite station carries both parts and tooling in timed relation to the main conveyor.

3 Claims, 11 Drawing Figures

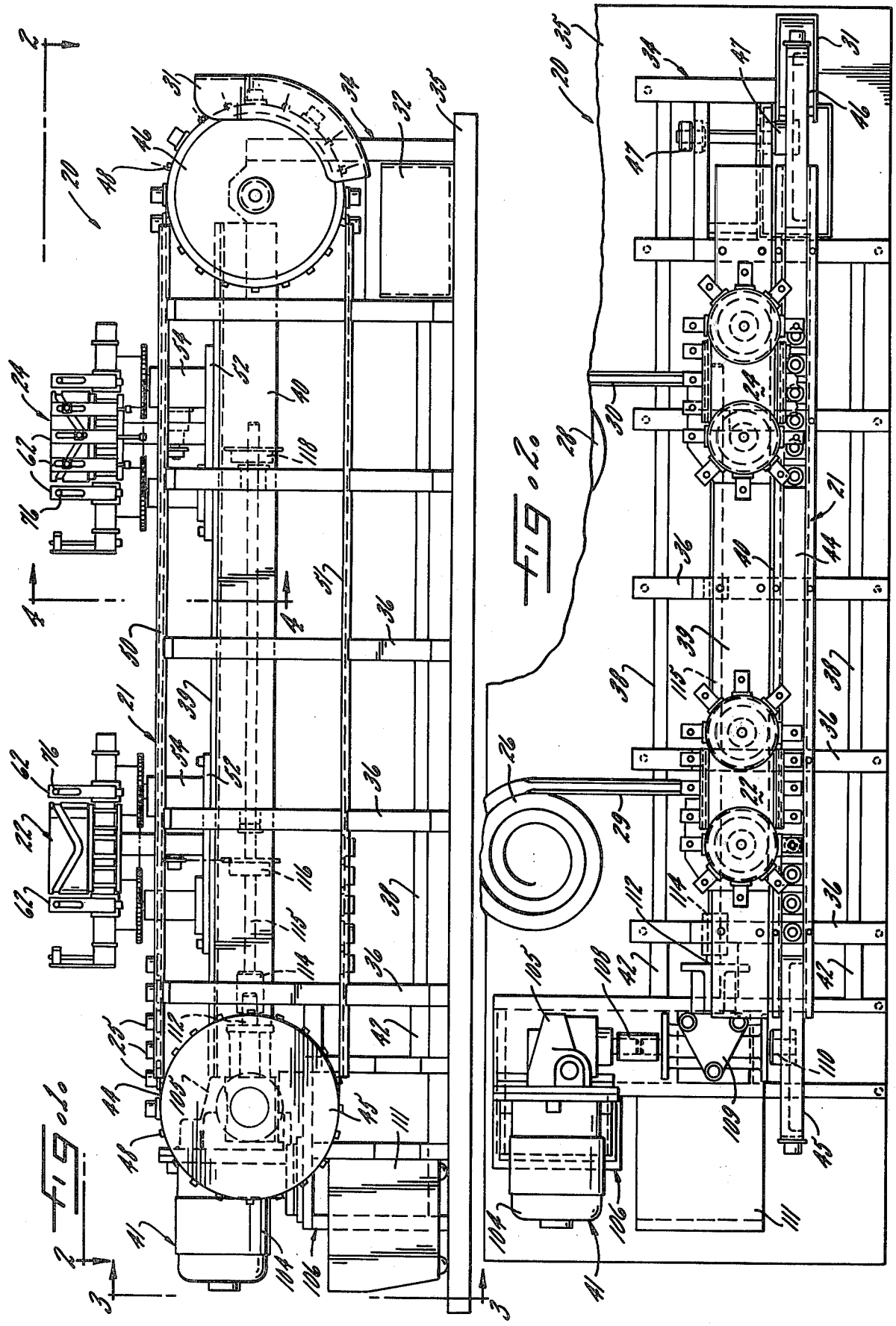

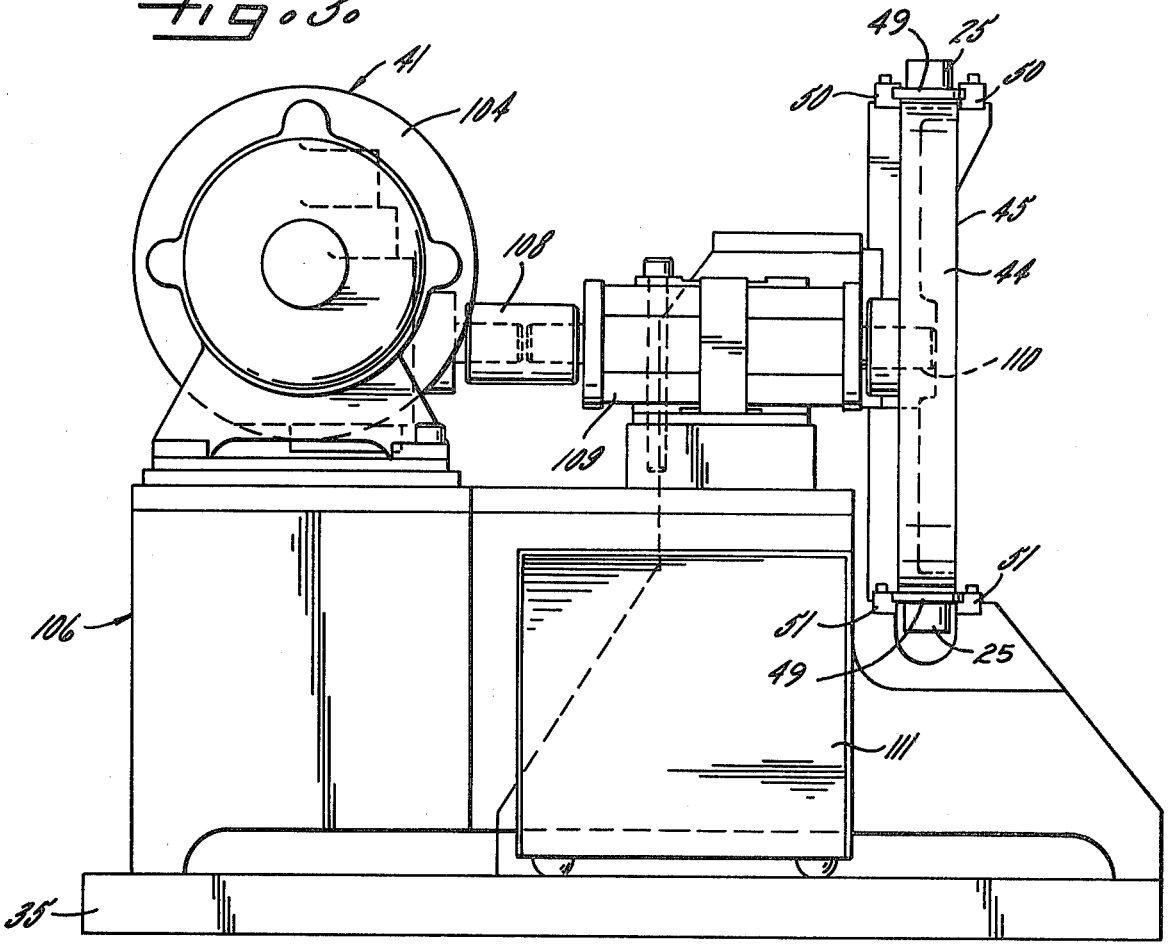
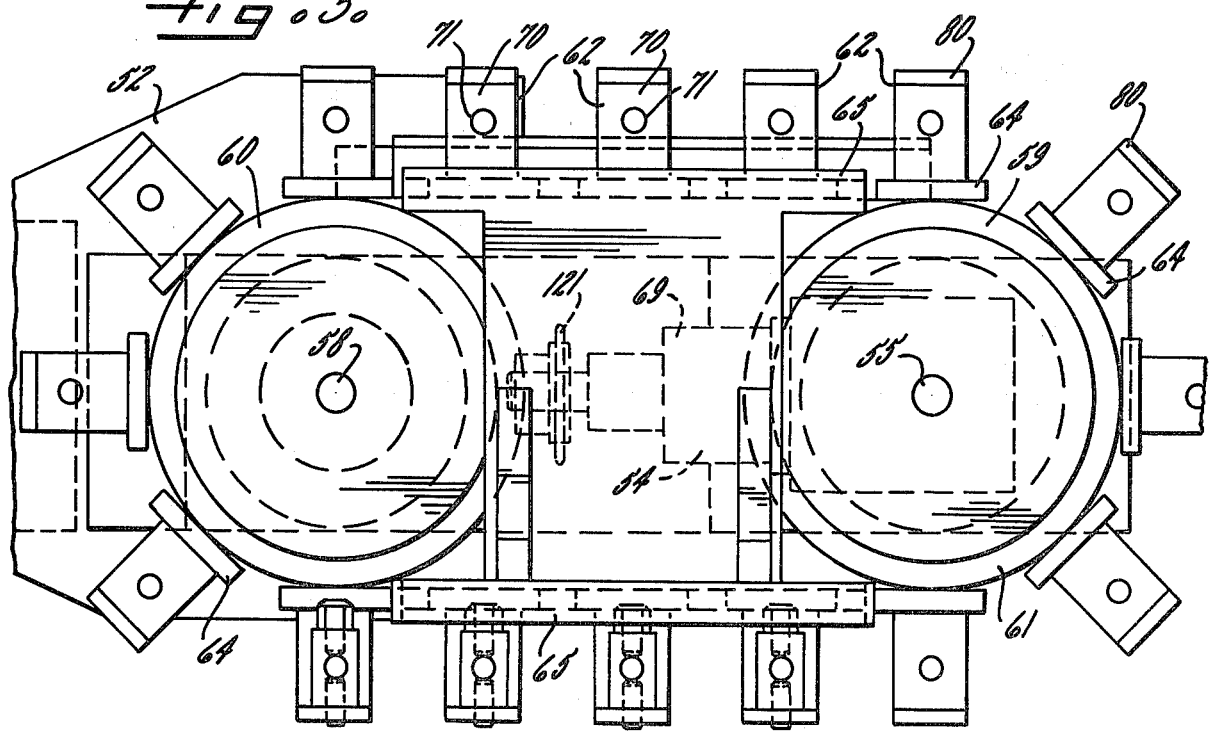

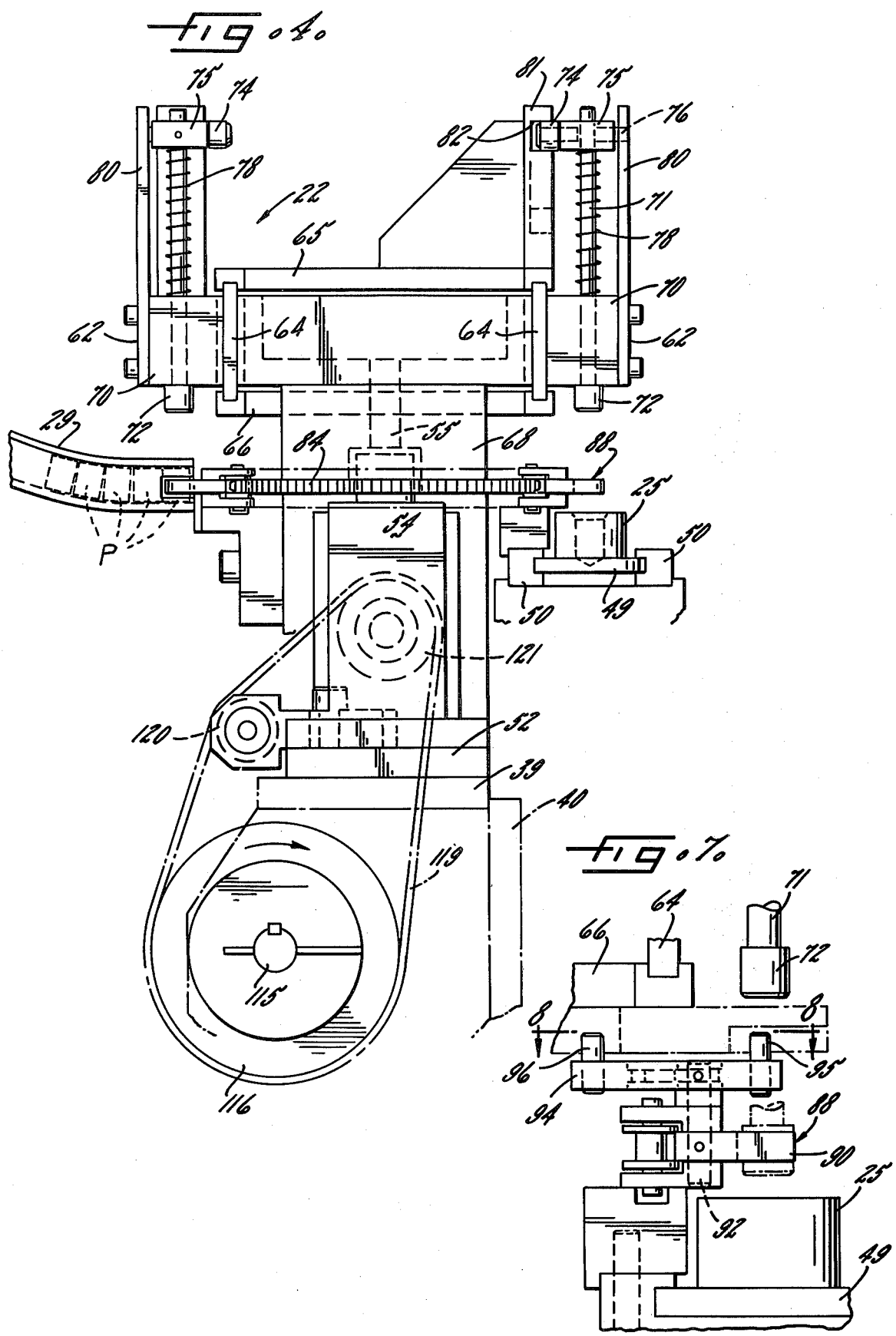

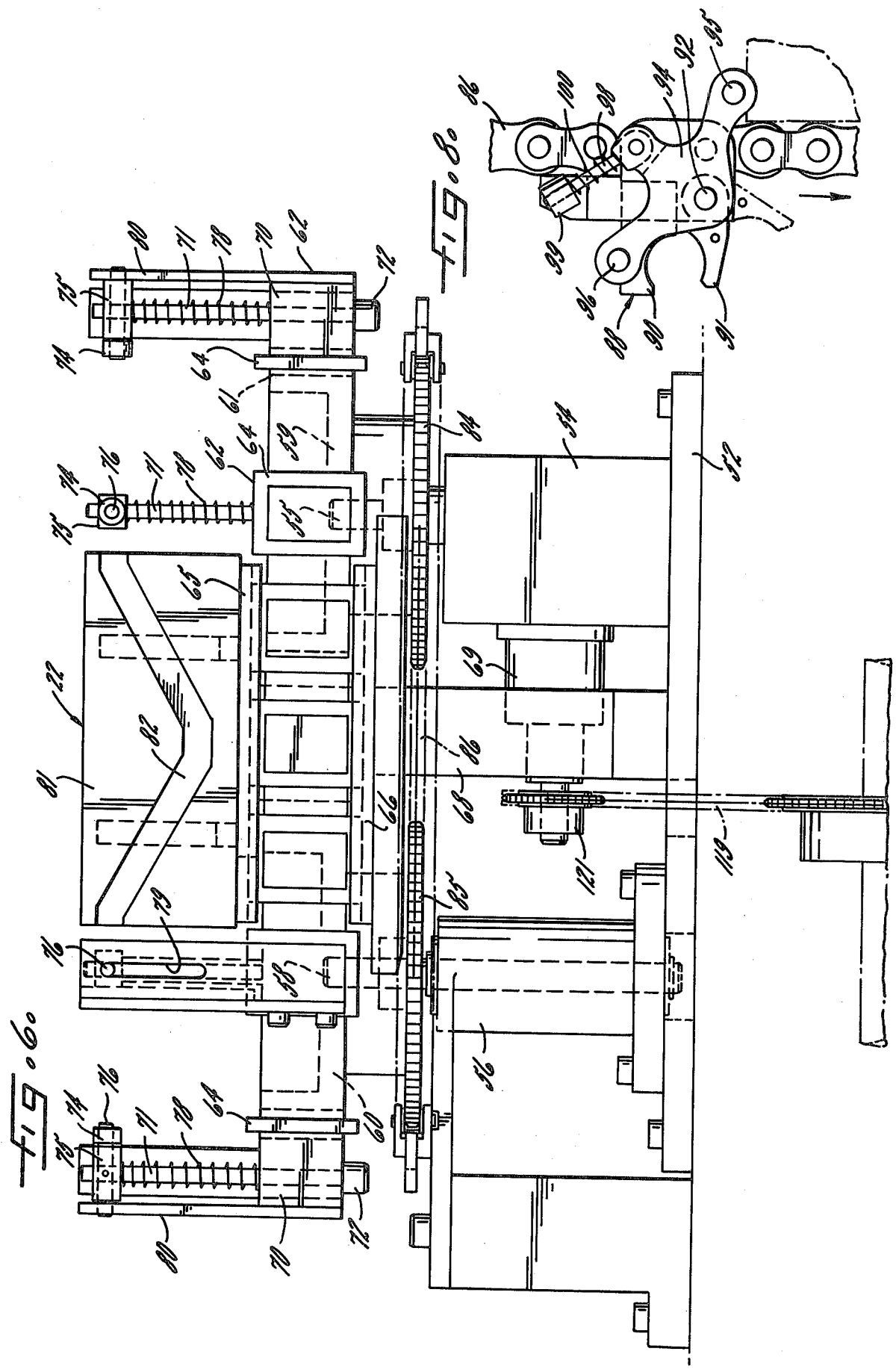

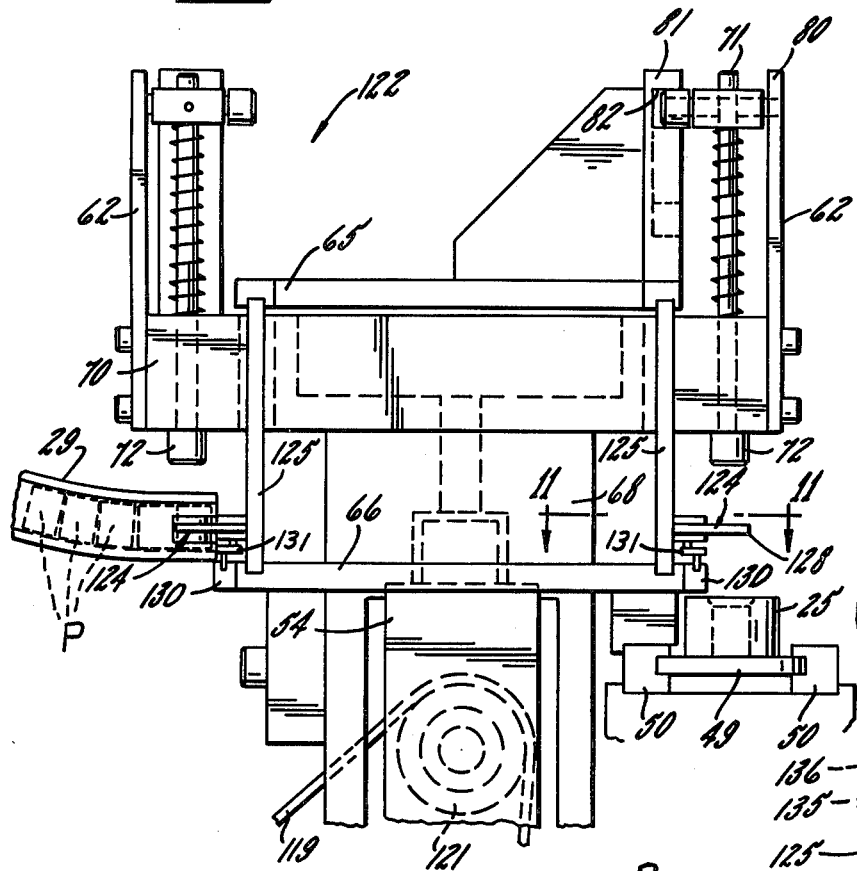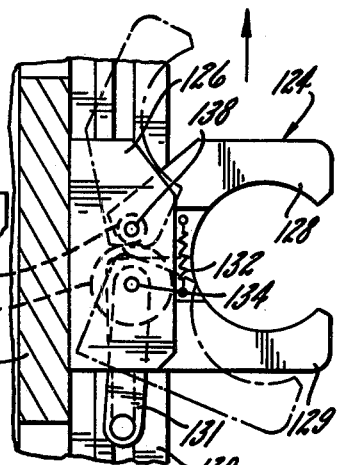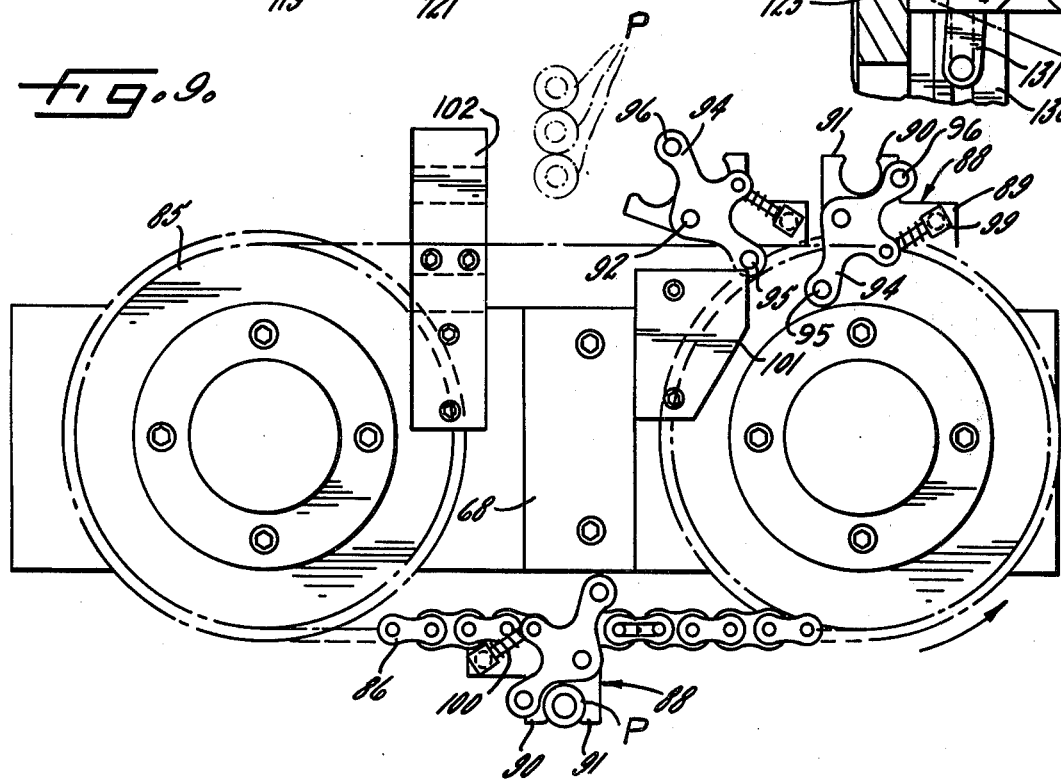

HIGH SPEED CONTINUOUS ASSEMBLY MACHINE

DESCRIPTION OF THE INVENTION

The present invention relates to the field of automatic assembly machines and, more specifically, to a machine of the continuous type as distinguished from the cyclic type.

Automatic assembly machines have become increasingly important in a wide variety of manufacturing operations. Increased usage of such machines has resulted in increased pressure to adapt them to greater varieties of products and to achieve higher production rates than previously possible. Machines of the cyclic type enjoy a wide variety and diversified range of applications. These machines, however, are designed to index in step-by-step fashion at a given number of cycles per minute. Every cycle requires acceleration and deceleration of the transport means, with part feeding and tool operation taking place during each cycle. While cyclic type machines perform satisfactorily for a number of products, they are inherently slow because work handling and tool operation occur only during the time that the transport means is at rest. These characteristics limit the cyclic type machine to production rates on the order of 60 assemblies per minute or less.

One object of the present invention is to provide a high speed continuous assembly machine utilizing a straight line transport system and capable of producing at a rate of 120 to 1200 assemblies per minute.

Another object of the invention is to provide an automatic assembly machine of the foregoing type capable of handling a wide variety of regular parts such as tubes, discs, rods and cylinders and performing a wide variety of assembly operations thereon.

Another object of the invention is to provide a high speed assembly machine of the character set forth which will be of simple, rugged construction and adapted to operate reliably with minimum down time.

Other objects and advantages will become apparent from the following description, taken together with the accompanying drawings wherein:

FIG. 1 is a side elevational view of an illustrative assembly machine exemplifying the present invention.

FIG. 2 is a plan view of the assembly machine shown in FIG. 1.

FIG. 3 is an enlarged elevational view showing the left hand end of the machine as viewed in FIGS. 1 and 2.

FIG. 4 is an enlarged transverse vertical sectional view through the machine taken in the plane of the line 4—4 in FIG. 1.

FIG. 5 is an enlarged plan view of one of the tooling satellite stations of the machine as shown in FIG. 2.

FIG. 6 is an enlarged side elevational view of one of the tooling satellite stations as shown in FIG. 1.

FIG. 7 is a further enlarged elevational view detailing one of the workpiece pick-up chucks associated with the satellite tool heads.

FIG. 8 is a fragmentary plan view of the pick-up chuck taken in the plane of the line 8—8 in FIG. 7.

FIG. 9 is an enlarged horizontal sectional view to the same scale as FIG. 5 but showing the pick-up chuck driving means.

FIG. 10 is an enlarged transverse vertical sectional view similar to FIG. 4 but showing a modified arrangement of the satellite tool heads and pick-up chucks.

FIG. 11 is an enlarged fragmentary plan view of one of the pick-up chucks shown in FIG. 10.

While the invention is susceptible of various modifications and alterative constructions, certain illustrative embodiments have been shown in the drawings and will be described below in considerable detail. It should be understood, however, that there is no intention to limit the invention to the specific form disclosed but, on the contrary, the intention is to cover all modifications, alternative constructions, and equivalents falling within the scope of the appended claims.

Referring more specifically to FIGS. 1 and 2, the invention is there exemplified in an illustrative high speed continuous assembly machine 20 adapted to produce assembled units at rates ranging between 120 and 1200 per minute. The machine 20 comprises a work transport conveyor 21 of the flexible band type which moves continuously in a straight line longitudinally of the machine in cooperative relation with a plurality of satellite stations 22, 24 spaced longitudinally along the conveyor. Each of the satellite stations is provided with transfer and tooling elements which move continuously in timed relation with the work transfer conveyor 21 and work fixtures 25 carried thereon. The satellite stations are adapted to transfer oriented parts P from supply sources such as hoppers 26, 28, respectively associated therewith, via gravity discharge tracks 29, 30 to the work fixtures 25 on the transport conveyor 21, and to perform various tooling, assembly and testing operations on the parts in the work fixtures as they move in unison with the conveyor. Completed assemblies are discharged into a chute 31 at the right hand end of the machine as viewed in FIG. 1 and collected in a receptacle 32.

The machine 20 is organized upon a rigid frame 34 comprising a bed 35 of generally rectangular form and a series of longitudinally spaced upright stanchions 36. The length of the bed and the number of stanchions may vary depending upon the number of operations and complexity of the parts to be handled by the machine. The stanchions 36 are rigidly fixed to the bed 35 in any suitable manner and braced adjacent their lower ends by means of a pair of tie rods 38. The stanchions are secured adjacent their upper ends to horizontal tooling plate 39 and vertical tooling plate 40 which extend substantially the full length of the machine. The tooling plates 39, 40, are of precisely dimensioned thickness and abut against corresponding machined surfaces of the stanchions 36. A drive unit 41 is mounted at one end of the frame 34 and secured at its lower end to an adjacent stanchion as by means of short struts 42. The drive unit is secured at its upper end to the tooling plates 39, 40.

The work transport conveyor 21 (FIGS. 1-4) comprises a flexible steel belt 44 trained in "over and under" fashion around sprockets 45, 46 which are disposed for rotation in a vertical plane. The sprocket 45 is journaled in and powered by the drive unit 41, while the sprocket 46 is journaled at the opposite end of the machine. Each of the sprockets is formed with a plurality of circumferentially spaced radial drive pins 48 which engage corresponding holes in the flexible steel belt. The sprocket 45 drives the steel band of the work transfer conveyor and the sprocket 46 serves as an idler and a tensioning means. For the latter purpose, the bearings 47 of the sprocket 46 are mounted for adjustment longitudinally of the machine in any suitable manner. The work fixtures 25 are each provided with a lateral guide flange 49 which engages upper lateral guide rails 50 along the upper reach of the conveyor belt 44 and lateral guide rails 51 along the lower reach of the belt 44. The guide rails 50, 51 are rigidly fixed to the stanchions of the machine frame and furnish both guidance and support to the work fixtures 25. The latter are secured to the work transport conveyor belt 44 in relatively closely spaced relation throughout its entire length. The fixtures 25 are adapted to receive parts from the satellite stations 22, 24 and to hold the parts during the various operations performed by the satellite station tooling incident to the continuous motion of the work transport conveyor 21.

Turning next to the satellite stations, of which the machine may have as many as five, the configuration of each is identical except for differences in specific tooling or function applicable to a particular operation. A description of one satellite station, in this case the station 22, will therefore suffice for all. Referring more specifically to FIGS. 4–6, it will be noted that the satellite station 22 comprises a base 52 fixed to the horizontal tooling plate 39. The base has mounted thereon a miter gear box 54 with a vertical drive shaft 55 projecting upwardly therefrom and a support block 56 having a vertically disposed idler shaft 58 extending upwardly therefrom and journaled therein. The shaft 55 is fixed to a drive sprocket 59 while the shaft 58 is fixed to an idler sprocket 60. An endless flexible steel carrier belt 61 is trained around the sprockets 59, 60 and adapted to move in a horizontal plane. The belt carries a plurality of tool heads 62 arranged in longitudinally spaced relation along the length of the belt 61, the spacing between the tool heads corresponding to that between the work transport fixtures on the transport conveyor 21. For the purpose of guiding and supporting the tool heads 62 as they move between the sprockets 59, 60, each tool head is mounted on a platen 64 which abuts against the carrier belt 61 and overhangs both edges of the latter. The overhanging portions of the tool platen 64 engage corresponding pairs of grooves in upper and lower guide blocks 65, 66. The guide blocks are fixed in any suitable manner to an upstanding column 68 mounted on the satellite base 52. In the present instance, the column 68 is defined by a pair of laterally spaced plates which straddle the horizontally projecting hub 69 of the miter gear box 54.

Each of the tool heads 62 comprises a body 70 fixed to the tool platen 64 and carrying a vertically reciprocable ram 71 (FIGS. 4–6). The lower end of the ram 71 is formed with a head 72 of greater diameter than the remaining portion. The upper end portion of the ram 71 carries a cam follower roller 74, spacer block 75, and roller pin 76. The ram is biased in an upward position by means of a compression spring 78 interposed between the body 70 and the spacer block 75 in surrounding relation with the ram. The latter is guided in its vertical reciprocating movement by the body 70 and by the vertical slot 79 in upstanding guide plate 80 fixed to the body.

Each of the tool head rams 71 is adapted to cooperate with a fixed cam 81 mounted on the upper guide block 65. The cam 81 is formed with a generally V-shaped cam track 82 engaged by the follower roller 74 as the tool head is traversed by the carrier belt 61 (FIGS. 4 and 6). Thus as the belt 61 and the tool heads 62 are orbited in a horizontal plane, each ram 71 is driven through a downward stroke and an upward stroke as it passes the fixed cam 81. The movement is synchronized with that of the work transport conveyor 21 so that the rams successively register with corresponding ones of the work fixtures 25, performing the necessary tooling or testing operations during the continuous motion of each.

Provision is made in the satellite station 22 for picking up the parts from the transfer station defined by the end of the supply source track and presenting them successively to the work fixtures 25 and tool heads 62. For this purpose, sprockets and in this instance 84, 85 (FIGS. 4, 6) are mounted respectively on vertical drive shaft 55 and vertical idler shaft 58 in spaced relation below the tool head carrier belt 61. An endless chain 86 is trained around the sprockets 84, 85 and carries a series of pick-up chucks 88 in this case corresponding in number and spacing to that of the tool heads 62.

Referring more specifically to FIGS. 7–9, it will be noted that each pick-up chuck 88 comprises a plate like body 89 attached in straddling relation to the chain 86. The body 89 has a fixed jaw 90 and a movable jaw 91 defined therein and generally coplanar with each other. The movable jaw 91 is pivotally attached to the body as by means of pivot pin 92. The chuck also includes a rocker arm 94 fixed to the pivot pin 92 for movement in unison with the movable jaw 91. The rocker arm 94 includes a pair of actuating pins 95, 96 adapted, respectively, to open and close the jaw 91. The opening pin 95 is situated at the trailing end of the rocker arm and the closing pin 96 is situated at the leading end when the jaw 91 is open, and conversely when the jaw 91 is closed (See FIGS. 8 and 9). The rocker arm is provided with an over-center biasing means comprising a link 98 pivotally attached at one end to the rocker arm and slidably engaged at its opposite end with a block 99 pivotally mounted on the chuck body 89. A biasing compression spring 100 surrounds the link 98 and is interposed between the pivoted end thereof and the pivot block 99. By reason of this mechnism, the chuck jaws 90, 91 may be spring biased in either the open or the closed position.

In operation, as the chain 86 moves each pick-up chuck 88 around the right-hand sprocket 84 (as viewed in FIGS. 5 and 9), the actuating pin 95 on the trailing end of the rocker arm is accosted by the fixed trip block 101, opening the movable jaw 91 relative to the fixed jaw 90. Further movement of the chain 86 and chuck 88 permits the open jaws to engage a part at the discharge end of the hopper track 29. At approximately the same time, the actuating pin 96 on the leading end of the rocker arm engages fixed trip block 102 P by sweeping it from the hopper track 29, closing the jaws on the engaged part. By reason of the fact that the pick-up chucks 88 are spaced so as to register with corresponding tool heads, the engaged part P is carried around the sprocket 85 in alinement with an overlying tool head 62 and ultimately in registration with an underlying work fixture 25. Further movement of these members results in downward movement of the tool head ram 71, pushing the part out of the jaws 90, 91 and down into the work fixture for a tooling operation.

The machine 20 is powered by the drive unit 41 (FIGS. 1–3) situated at the left hand end of the machine as viewed in FIG. 1. The unit 41 comprises a main drive motor 104 with an associated speed reducer 105 mounted on a supporting sub-frame 106. The output shaft of the speed reducer 105 is connected as by coupling 108 to a miter gear box 109 also mounted on the sub-frame. A main shaft 110 passing through the miter gear box supports the drive sprocket 45 of the work transport conveyor, being drivingly connected thereto. The motor 104 also includes a clutch for start-up purposes and a brake for quick stopping of the drive when necessary (not shown). A speed control unit 111 is situated adjacent the sub-frame 106 and serves to regulate the motor so as to drive the work transport conveyor 21, and associated satellite stations, at a selectable constant velocity.

Power for driving the satellite stations 22, 24 in synchronism with the work transport conveyor 21 is obtained from right angle drive shaft 112 of the miter gear box 109. The shaft 112 is connected as by coupling 114 to a line shaft 115 extending longitudinally of the conveyor 21 and journaled in the machine frame 34. The line shaft 115 carries power take-off sprockets 116, 118 drivingly associated with respective ones of the satellite stations 22, 24. As shown more clearly in FIG. 4, for example, the power take-off sprocket 116 is connected as by timing chain 119, over idler 120, to the input sprocket 121 of the miter gear box 54 which transmits power to the vertical drive shaft 55 of satellite station 22. A similar drive arrangement is used with power take-off sprocket 118 of satellite station 24. Timing adjustment of these drives with respect to the work transport conveyor may be accomplished in any conventional manner.

Referring next to FIGS. 10 and 11, there is shown a modified form of satellite station 122 utilizing many of the compounds of the satellite station 22 but differing specifically in the configuration and mounting of the pick-up chucks 124. The station 122 includes the same cam controlled tool heads 62, flexible steel carrier belt 61, and sprockets 59, 60 described earlier herein in connection with satellite station 22. In this instance, however, the separate drive chain and sprockets for the pick-up chucks are eliminated and the pick-up chucks 124 are supported from the carrier belt 61 along with the tool heads 62. The foregoing is accomplished by utilizing a vertically elongated tool platen 125 between each tool head and the carrier belt 61. The platen 125 extends downwardly a sufficient distance to serve as a mounting plate for the pick-up chuck 124. The upper guide block 65 engages the top portion of the tool platen 125 while the lower guide block 66 is shifted downwardly on the support cloumn 68 a sufficient distance to accommodate the bottom portion of the platen 125.

Each pick-up chuck 124, shown in detail in FIG. 11, is of the cam controlled type. It includes a body 126 fixed to the lower depending portion of an associated tool platen 125. The body has a pair of relatively movable jaws 128, 129 pivotally mounted thereon, the jaw 128 being disposed in leading relation to the direction of movement of the carrier belt and the jaw 129 being disposed in trailing relation with respect thereto. The jaws 128, 129 are actuated by means of a fixed cam 130 mounted on the lower guide block 66, and a follower link 131 which engages the track of cam 130. To control the jaws 128, 129 when the follower link 131 is not engaged with the fixed cam 130, the jaws are normally urged toward closed position by biasing spring 132.

In order to impart greater angular motion to the leading jaw 128 than the trailing jaw 129, so that the jaw 128 will clear the part to be transferred from the hopper track, a differential motion mechanism is utilized. Accordingly, the follower link 131 and the trailing jaw 129 are secured together to move in unison by means of connecting first pivot shaft 134. This imparts a relatively small angular motion to the jaw 129. The first pivot shaft 134 also has a relatively large drive gear 135 rigidly fixed thereto. The latter meshes with a relatively smaller diameter pinion 136 fixed to a second pivot shaft 138 which, in turn, is rigidly fixed to the leading jaw 128. The resulting angular motion of the jaw 128 is thus multiplied substantially compared to that of the jaw 129.

It will be appreciated from the foregoing that the machine 20 is adapted to perform a wide spectrum of assembly operations as an incident to registration of the tool heads, pick-up chucks and work fixtures as those members travel at a selected constant velocity in a straight line along the work transport conveyor. As an incident to such travel, for example, the machine is adapted at the first satellite station to load parts, thread or otherwise fasten them together into an assembled unit, test the unit, and unload the unit, all at a production rate exceeding 120 units per minute. Addition operations may be performed in like manner at subsequent satellite stations along the work transport conveyor.

We claim as our invention:

1. In a high speed continuous assembly machine adapted to assemble parts of regular shape such as tubes, discs, rods and cylinders, the combination comprising:
   (a) a machine frame;
   (b) a work transport conveyor journaled in said frame;
   (c) a series of work fixtures mounted in longitudinally spaced relation along said conveyor;
   (d) a satellite station mounted on said frame in position to feed parts to said work transport conveyor;
   (e) said satellite station including an endless carrier having a portion parallel to said work transport conveyor and being driven at the same linear speed as the latter;
   (f) a plurality of tool heads fixed to said carrier for movement in unison therewith, said tool heads being longitudinally spaced for registration with consecutive ones of said work support fixtures;
   (g) discharge means defining a transfer station for feeding parts to said satellite station;
   (h) a plurality of pick-up chucks each fixed to said carrier for movement in unison therewith, said pick-up chucks being longitudinally spaced for cooperation with respective ones of said tool heads;
   (i) each said pick-up chuck having a chuck body;
   (j) a pair of relatively movable gripping jaws pivotally mounted on said body;
   (k) a cam follower pivotally mounted on said body for movement in unison with one of said jaws;
   (l) a drive gear mounted for movement in unison with said one jaw and said cam follower;
   (m) a pinion disposed in meshing engagement with said drive gear; and
   (n) said pinion being mounted for movement in unison with the other of said jaws, the movement of said other jaw being substantially greater than that of said one jaw.

2. The combination set forth in claim 1 wherein said one jaw is disposed in trailing relation and said other jaw is disposed in leading relation with respect to the direction of movement of said carrier.

3. The combination set forth in claim 1 wherein said satellite station further comprises:

(a) a tool platen fixed to each said tool head and to said carrier, said platen having a depending portion;

(b) guide means for constraining said carrier to move in a straight line;

(c) said guide means engaging both the top and bottom portions of each said tool head platen; and (d) fixed cam means mounted on said guide means for actuating said cam follower and said jaws.

* * * * *